United States Patent
Horn et al.

(10) Patent No.: US 10,512,005 B2
(45) Date of Patent: Dec. 17, 2019

(54) SECURITY IN INTERSYSTEM MOBILITY

(71) Applicant: Nokia Technologies Oy, Espoo (FI)

(72) Inventors: Guenther Horn, München (DE); Nagendra S. Bykampadi, Bangalore (IN); Suresh P. Nair, Whippany, NJ (US)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 15/822,907

(22) Filed: Nov. 27, 2017

(65) Prior Publication Data
US 2019/0104447 A1 Apr. 4, 2019

(30) Foreign Application Priority Data
Sep. 29, 2017 (IN) .............................. 201741034678

(51) Int. Cl.
*H04L 29/06* (2006.01)
*H04W 12/06* (2009.01)
*H04W 36/00* (2009.01)
*H04W 12/10* (2009.01)
*H04W 12/04* (2009.01)
(Continued)

(52) U.S. Cl.
CPC ..... *H04W 36/0038* (2013.01); *H04L 63/0876* (2013.01); *H04W 12/06* (2013.01); *H04W 12/1004* (2019.01); *H04W 8/08* (2013.01); *H04W 12/04* (2013.01); *H04W 36/10* (2013.01)

(58) Field of Classification Search
CPC ... H04W 12/06; H04W 4/70; H04W 36/0083; H04W 16/14; H04W 36/0077; H04W 8/08; H04L 63/20; H04L 63/08; H04L 63/105
See application file for complete search history.

(56) References Cited

U.S. PATENT DOCUMENTS

| 2010/0177737 A1 | 7/2010 | Song et al. | |
| 2012/0202500 A1 | 8/2012 | Wu | |
| 2017/0324733 A1* | 11/2017 | Howry et al. | H04L 63/0823 455/411 |

FOREIGN PATENT DOCUMENTS

| EP | 2117248 | 11/2009 |
| EP | 18195844 | 1/2019 |

(Continued)

OTHER PUBLICATIONS

3GPP, "3rd Generation Partnership Project; Technical Specification Group Services and System Aspects; System Architecture for the 5G System; Stage 2 (Release 15)," 3GPP TS 23.501, V0.4.0, Apr. 2017, 124 pages.

(Continued)

*Primary Examiner* — Gary Lafontant
(74) *Attorney, Agent, or Firm* — Ryan, Mason & Lewis, LLP

(57) ABSTRACT

In accordance with the occurrence of a mobility event whereby user equipment moves from accessing a source network to accessing a target network in a communication system environment, the user equipment sends a control plane message to the target network comprising an integrity verification parameter associated with the source network and an integrity verification parameter associated with the target network. By providing integrity verification parameters for both the source network and the target network in an initial message sent by the user equipment to the mobility management element of the target network, the mobility management element of the target network can verify the user equipment on its own or seek the assistance of the source network.

27 Claims, 4 Drawing Sheets

(51) Int. Cl.
    *H04W 8/08*     (2009.01)
    *H04W 36/10*    (2009.01)

(56) References Cited

FOREIGN PATENT DOCUMENTS

| JP | 2008131653 A | 6/2008 |
| JP | 2010533390 A | 10/2010 |
| JP | 2018179621 A | 9/2019 |

OTHER PUBLICATIONS

3GPP, "3rd Generation Partnership Project; Technical Specification Group Services and System Aspects; Study on the the Security Aspects of the Next Generation System (Release 14)," 3GPP TR 33.899, V1.1.0, Mar. 2017, 491 pages.
3GPP, "3rd Generation Partnership Project; Technical Specification Group Services and System Aspects; Security Architecture and Procedures for 5G System (Release 15)," 3GPP TS 33.501, V0.3.0, Aug. 2017, 44 pages.
3GPP, "3rd Generation Partnership Project; Technical Specification Group Services and System Aspects; 3GPP System Architecture Evolution (SAE); Security Architecture (Release 15)," 3GPP TS 33.401, V15.1.0, Sep. 2017, 161 pages.
Qualcomm Incorporated, "pCR to provide a solution for interworking bertween NextGen Core and EPC," 3GPP TSG SA WG3, Meeting #88, S3-172014, 3rd Generation Partnership Project, Mobile Competence Centre, Aug. 7-11, 2017, 3 pages, China.
Nokia, "pCR to 33.501 clause 6.2 NAS Security," 3GPP TSG SA WG3, Meeting #88, S3-171819, 3rd Generation Partnership Project, Mobile Competence Centre, Aug. 7-11, 2017, 3 pages, China.

\* cited by examiner

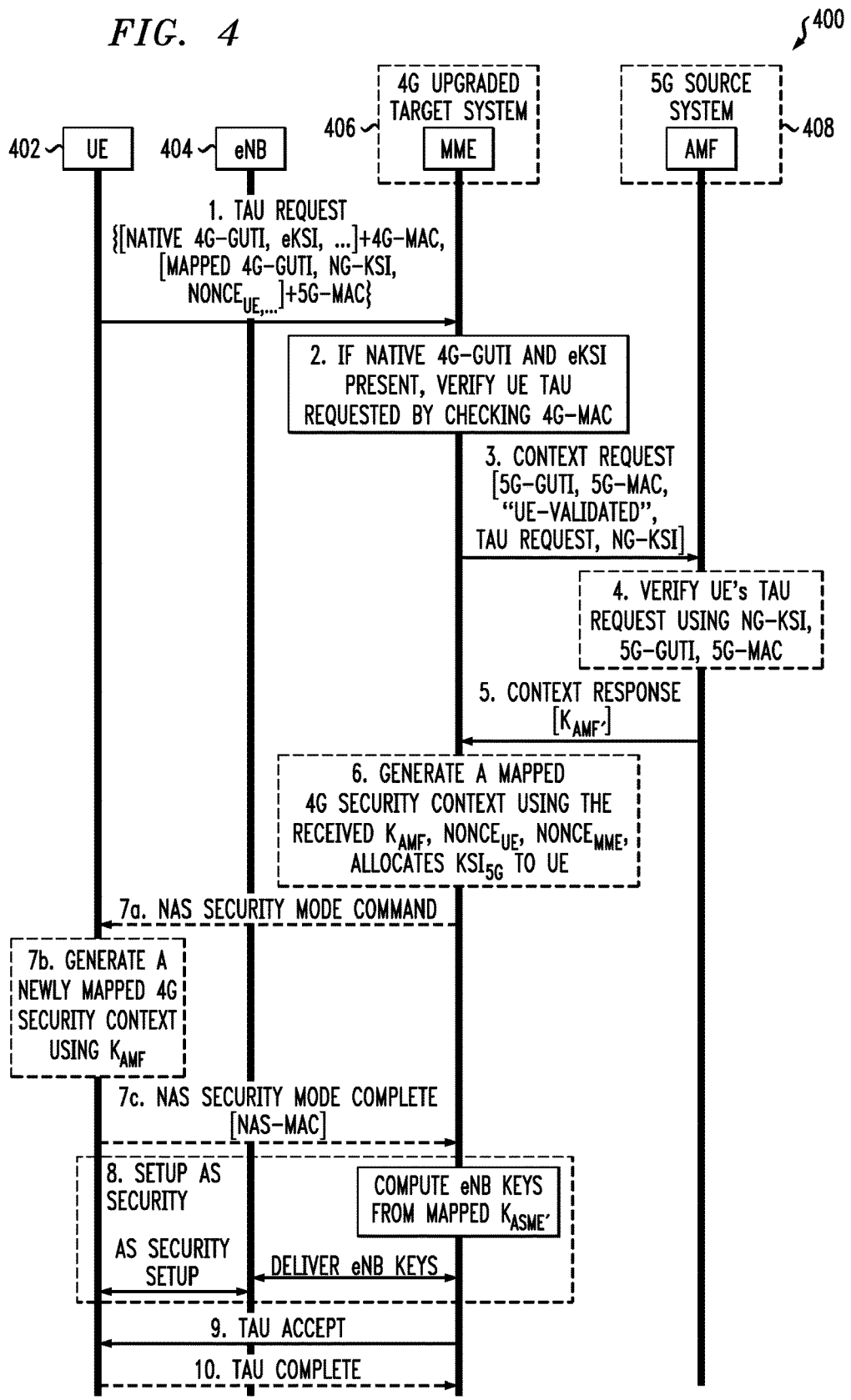

US 10,512,005 B2

SECURITY IN INTERSYSTEM MOBILITY

FIELD

The field relates generally to communication systems, and more particularly, but not exclusively, to security within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services intended to provide improved wireless Internet access for mobile devices.

Security during mobility of user equipment or UE (such as, for example, a mobile terminal or subscriber) between two networks (i.e., intersystem mobility) is an important consideration. For example, initial Non-Access Stratum (NAS) messages, e.g., registration messages, between the UE and a network are integrity protected by the UE if there is a current NAS security context in the UE that is valid and accepted by the network.

Today, in the scenario where the UE is moving between networks, e.g., interworking between a 4G network and 5G network, adequate integrity verification is not yet defined.

SUMMARY

Illustrative embodiments provide improved techniques for secure intersystem mobility of user equipment in a communication system environment.

In one or more methods according to illustrative embodiments, in accordance with the occurrence of a mobility event whereby user equipment moves from accessing a source network to accessing a target network in a communication system environment, the user equipment sends a control plane message to the target network comprising an integrity verification parameter associated with the source network and an integrity verification parameter associated with the target network.

In another illustrative embodiment, in accordance with the occurrence of a mobility event whereby user equipment moves from accessing a source network to accessing a target network in a communication system environment, a mobility management element of the target network receives a control plane message from the user equipment comprising an integrity verification parameter associated with the source network and an integrity verification parameter associated with the target network.

In a further embodiment, in accordance with the occurrence of a mobility event whereby user equipment moves from accessing a source network to accessing a target network in a communication system environment, a mobility management element of the source network receives a context request message from a mobility management element of the target network when the mobility management element of the target network is unable to verify the user equipment based on a control plane message received from the user equipment comprising an integrity verification parameter associated with the source network and an integrity verification parameter associated with the target network.

Advantageously, by providing integrity verification parameters for both the source network and the target network in a control plane message sent by the user equipment to the mobility management element of the target network (e.g., a Registration Request message in 5G and a Tracking Area Update message in 4G), the mobility management element of the target network does not have to initiate a new Authentication and Key Agreement (AKA) run and thus, among other benefits, avoids performance degradation. Rather, the target network can verify the user equipment on its own or seek the assistance of the source network.

Further embodiments are provided in the form of non-transitory computer-readable storage medium having embodied therein executable program code that when executed by a processor causes the processor to perform the above steps. Still further embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 shows a message flow for a secure intersystem mobility procedure in another illustrative embodiment.

DETAILED DESCRIPTION

Figure 1:
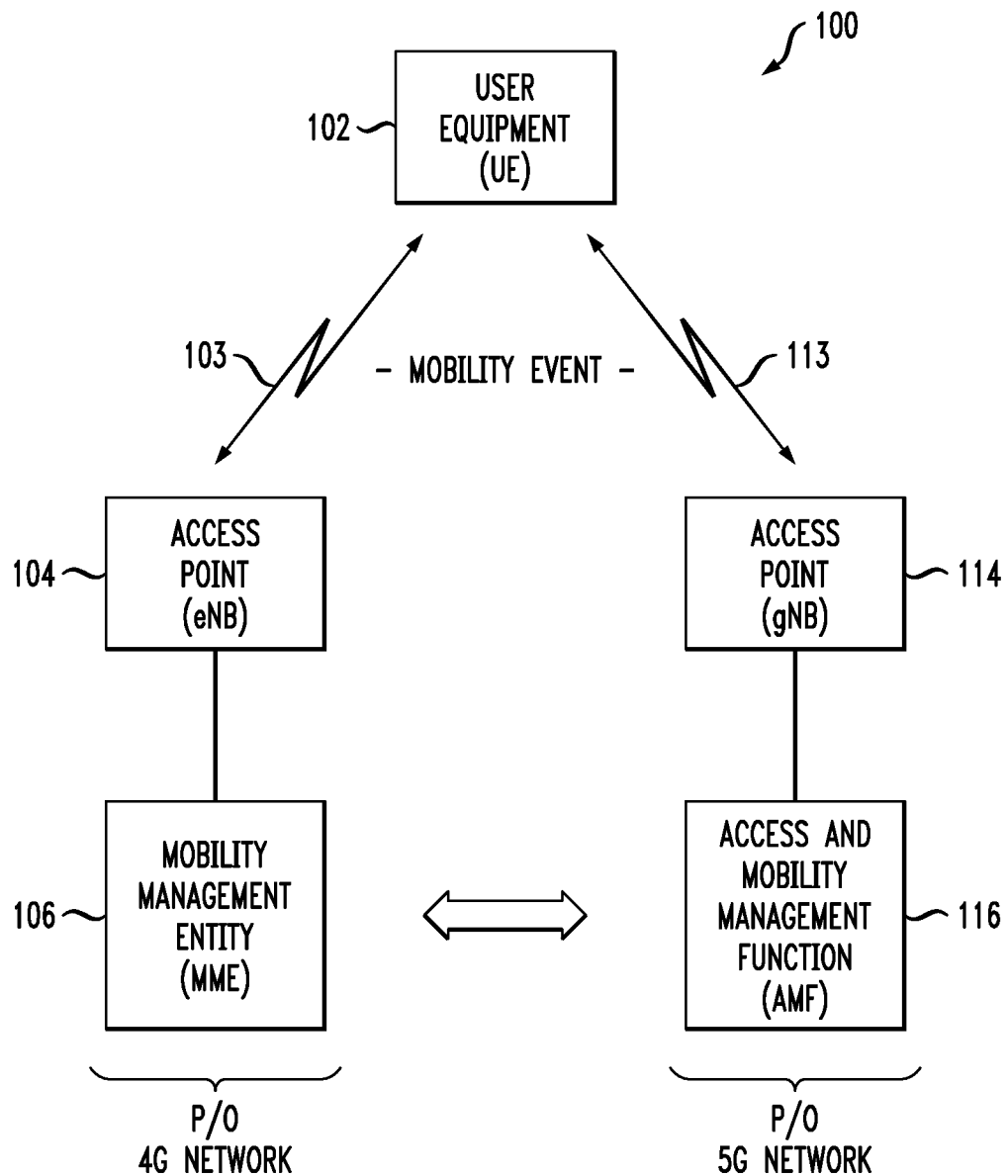
FIG. 1 shows a block diagram of a communication system environment in an illustrative embodiment.

Embodiments will be illustrated herein in conjunction with example communication systems and associated techniques for providing security for user equipment during intersystem mobility that, among other benefits, avoids performance degradation of the core network. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as an LTE Evolved Packet Core (4G) and a 3GPP next generation system (5G), the disclosed embodiments can be adapted in a straightforward manner to a variety of other types of communication systems including, but not limited to, WiMAX systems and Wi-Fi systems.

In existing systems, a single Message Authentication Code (MAC) parameter is used to integrity protect the NAS message sent to a network. In the case of a mobility event (active mode mobility, i.e., handover, or idle mode mobility) from a source network to a target network, an initial NAS message is sent to the target network to trigger the mobility event. If the UE still has a valid security context for the target network, it will integrity-protect the NAS message using this security context and use the MAC parameter to send the generated MAC code to the target network. In existing approaches, the NAS-MAC parameter is a common parameter that either contains the authentication code to be verified by the source network or by the target network. This is no problem as long as source and target networks are both of the same type, say they are both LTE networks. It becomes a problem, however, when the source and target networks are of different types, say the source network is an LTE network and the target network is a 5G network; the problem is that the MACs used in LTE are (very likely) different from those that will be used in 5G. However, there exists no mechanism today for the UE to send two independent MACs for both the source and the target networks to verify integrity of the message, if required.

Thus, a problem with the current mechanism is that the UE does not know before-hand whether the initial integrity-protected message it sent to the target network can be successfully verified by the target network. It is possible that the target network has deleted the corresponding "native" security context for the UE. In such a scenario, there is no way for the target network to verify the message. In addition, the target network cannot rely on the source network to verify the message because there is no other field to carry the second MAC to be verified by the source network.

The only logical action for the target network would be to re-authenticate the UE again by executing a fresh Authentication and Key Agreement (AKA) run and then generate NAS and AS (Access Stratum) security keys through relevant procedures. Re-authentication has, however, a significant negative performance impact, so solutions that can avoid this would be preferred.

As illustratively used herein, Non-Access Stratum (NAS) is a functional layer of a communication network that provides non-radio signaling for certain control plane functionalities between the UE and a Core Network (CN), transparent to the Radio Access Network (RAN). Such functionalities include, but are not limited to, mobility management, authentication, etc. Compare the NAS functional layer to the Access Stratum (AS), which is the functional layer below NAS that provides functionalities between the UE and the RAN including, but not limited to, data transport over a wireless connection and radio resource management.

Illustrative embodiments provide improved techniques for intersystem mobility scenarios. More specifically, in one embodiment, a parameter is provided in the initial NAS message in 5G to carry an additional 4G-MAC for verification by the source network, if required. In another embodiment, similarly, both 4G and 5G verification parameters are provided when the UE is moving from the 5G network to the 4G network.

Figure 2:
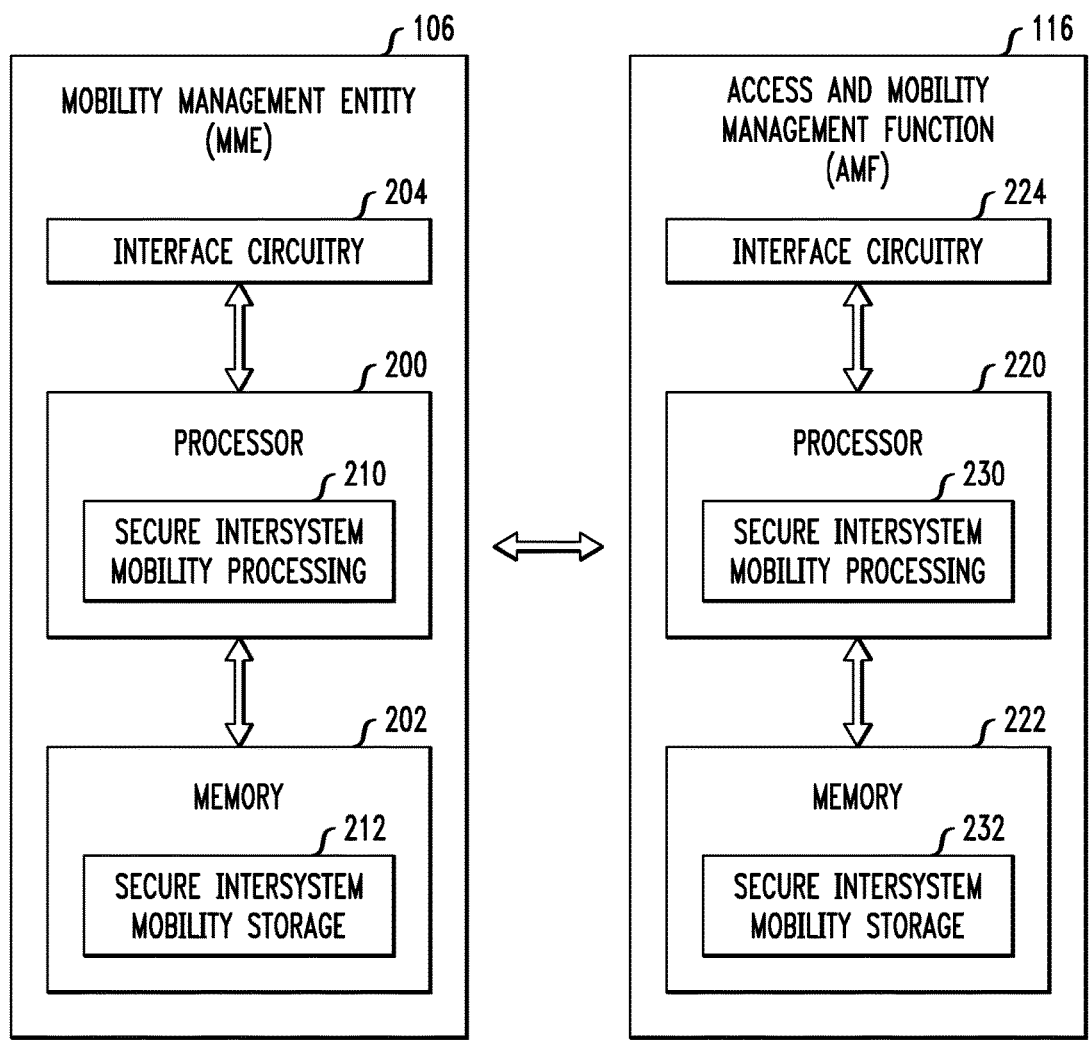
FIG. 2 shows a more detailed view of network elements/functions in an illustrative embodiment.

Before describing interworking scenarios with mobility from 4G to 5G, and from 5G to 4G, an exemplary communication system environment in which such illustrative embodiments are implemented is described in the context of FIGS. 1 and 2.

5G security aspects are addressed in 5G Technical Report (TR) 33.899, V1.1.0, entitled "3rd Generation Partnership Project; Technical Specification Group Services and System Aspects; Study on the security aspects of the next generation system (Release 14),", and in TS 33.501, v0.3.0, "Security Architecture and Procedures for 5G System," the disclosures of which are incorporated by reference herein in their entireties. Of particular interest are scenarios where the UE is moving from accessing a 5G network to accessing a 4G network, and in the converse, moving from accessing a 4G network to accessing a 5G network. Such movement between different generation communication networks is generally referred to herein as "intersystem mobility." In addition to security concerns, of course, performance degradation is also a concern for such networks, i.e., in the context of avoiding additional processing overhead when possible.

FIG. 1 shows a communication system environment 100 within which illustrative embodiments are implemented. More particularly, communication system environment 100 shows part of (P/O) a 4G network and part of a 5G network. It is assumed that a UE 102 is involved in a mobility event (active mode mobility, i.e., handover, or idle mode mobility) from a source network (i.e., from one of the 4G network and the 5G network) to a target network (i.e., to the other of the 4G network and 5G network). It is to be understood that the elements shown in communication system environment 100 are intended to represent main functions provided within the system, e.g., UE access functions and mobility management functions. As such, the blocks shown in FIG. 1 reference specific elements in LTE and 5G networks that provide the main functions. However, other network elements may be used to implement some or all of the main functions represented. Also, it is to be understood that not all functions of an LTE or 5G network are depicted in FIG. 1. Rather, functions that facilitate an explanation of illustrative embodiments are represented.

Accordingly, as shown in FIG. 1, communication system environment 100 comprises user equipment (UE) 102 that communicates via an air interface 103 with an access point (e.g., evolved Node B or eNB in a 4G network) 104 in the part of the 4G network shown in FIG. 1. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment. Such communication devices are also intended to encompass devices commonly referred to as access terminals.

In one embodiment, UE 102 is comprised of a Universal Integrated Circuit Card (UICC) and a Mobile Equipment (ME). The UICC is the user-dependent part of the UE and contains at least one Universal Subscriber Identity Module (USIM) and appropriate application software. The USIM securely stores the International Mobile Subscriber Identity (IMSI) number and its related key which are used to identify and authenticate subscribers to access networks. The ME is the user-independent part of the UE and contains terminal equipment (TE) functions and various mobile termination (MT) functions.

The access point 104 is illustratively part of an access network of the 4G network. Such an access network may comprise a plurality of base stations. The base stations may be logically separate entities, but in a given embodiment may be implemented in the same physical network element, such as, for example, a base station router or femto cellular access point. In an LTE (4G) network, the access network is an Evolved Universal Terrestrial Radio Access Network (E-UTRAN). In general, the access point provides access for the UE to a Core Network (CN), which then provides access for the UE to other UEs and/or a data network such as a packet data network (e.g., Internet).

The access point 104 in this illustrative embodiment is operatively coupled to a mobility management function 106. In a 4G network, the function is typically implemented by a Mobility Management Entity (MME). A mobility management function, as used herein, is the element or function in the CN part of the communication system that manages, among other network operations, access and authentication operations with the UE (through the access point 104).

Similarly, in the 5G network as shown in FIG. 1, the UE 102 may alternatively communicate via an air interface 113 with an access point (e.g., gNB in a 5G network) 114. For example, the 5G System is described in 5G Technical Specification (TS) 23.501, V0.4.0, entitled "Technical Specification Group Services and System Aspects; System Architecture for the 5G System," the disclosure of which is incorporated by reference herein in its entirety.

The access point 114 in this illustrative embodiment is operatively coupled to a mobility management function 116. In a 5G network, the function is implemented by an Access and Mobility Management Function (AMF). Although not expressly shown, a Security Anchor Function (SEAF) can be implemented with the AMF connecting a UE with the mobility management. Thus, $K_{SEAF}$ in 5G would take over the role of the Access Security Management Entity Key ($K_{ASME}$) in LTE.

It is to be appreciated that this particular arrangement of system elements in FIG. 1 is an example only, and other types and arrangements of additional or alternative elements can be used to implement a communication system in other embodiments. For example, in other embodiments, the system environment 100 may comprise authentication elements, gateway elements, as well as other elements not expressly shown herein.

Accordingly, the FIG. 1 arrangement is just one example configuration of a wireless cellular system environment, and numerous alternative configurations of system elements may be used. For example, although only single UE, eNB/gNB, and MME/AMF elements are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of function sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 114.

FIG. 2 shows a more detailed view of MME 106 and AMF 116 in an illustrative embodiment. The MME 106 comprises a processor 200 coupled to a memory 202 and interface circuitry 204. The processor 200 of the MME 106 includes a secure intersystem mobility processing module 210 that may be implemented at least in part in the form of software executed by the processor. The processing module 210 performs operations of the processes described in conjunction with subsequent figures and otherwise herein. The memory 202 of the MME 106 includes a secure intersystem mobility storage module 212 that stores data generated or otherwise used during secure intersystem mobility operations.

The AMF 116 comprises a processor 220 coupled to a memory 222 and interface circuitry 224. The processor 220 of the AMF 116 includes a secure intersystem mobility processing module 230 that may be implemented at least in part in the form of software executed by the processor. The processing module 230 performs operations described in conjunction with subsequent figures and otherwise herein. The memory 222 of the AMF 116 includes a secure intersystem mobility storage module 232 that stores data generated or otherwise used during secure intersystem mobility operations.

The processors 200 and 220 of the respective MME 106 and AMF 116 may comprise, for example, microprocessors, application-specific integrated circuits (ASICs), digital signal processors (DSPs) or other types of processing devices, as well as portions or combinations of such elements.

The memories 202 and 222 of the respective MME 106 and AMF 116 may be used to store one or more software programs that are executed by the respective processors 200 and 220 to implement at least a portion of the functionality described herein. For example, operations and other functionality as described in conjunction with subsequent figures and otherwise herein may be implemented in a straightforward manner using software code executed by processors 200 and 220.

A given one of the memories 202 or 222 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 202 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 204 and 224 of the respective MME 106 and AMF 116 illustratively comprise transceivers or other communication hardware or firmware that allows the associated system elements to communicate with one another in the manner described herein.

It is apparent from FIG. 2 that MME 106 is configured for communication with AMF 116 and vice-versa via their respective interface circuitries 204 and 224. This communication involves the MME 106 sending data to the AMF 116, and the AMF 116 sending data to the MME 106. However, in alternative embodiments, other network elements may be operatively coupled between MME 106 and AMF 116. That is, the mobility management elements/functions of the two networks can communicate with each other directly, indirectly through one or more intermediate network elements/functions, or some combination of both. The term "data" as used herein is intended to be construed broadly, so as to encompass any type of information that may be sent between user equipment and a core network via a base station element including, but not limited to, NAS messages, MAC codes, other verification parameters, etc.

It is to be appreciated that the particular arrangement of components shown in FIG. 2 is an example only, and numerous alternative configurations may be used in other embodiments. For example, the mobility management elements/functions can be configured to incorporate additional or alternative components and to support other communication protocols.

Other system elements, such as UE 102, eNB 104, and gNB 114, may each also be configured to include components such as a processor, memory and network interface. These elements need not be implemented on separate standalone processing platforms, but could instead, for example, represent different functional portions of a single common processing platform. Such a processing platform may additionally comprise at least portions of an eNB/gNB and an associated radio network control function.

Before describing message flows associated with embodiments of the secure intersystem mobility procedures, interworking scenarios with mobility from a 4G network to a 5G network are described, followed by interworking scenarios with mobility from a 5G network to a 4G network.

In a first scenario (4G to 5G), assume that the 4G network is the source network and the 5G network is the target network. The UE has a valid 4G NAS security context (as the UE has been registered in the 4G network up to the mobility event), and the UE may have a 5G NAS security context still stored from a previous visit to the 5G network.

According to illustrative embodiments, when the UE moves from a 4G network to a 5G network, and the UE still has a 5G NAS security context, then the UE includes two different MAC parameters in the initial NAS message:

(i) a MAC generated according to 5G specifications ('5G-MAC') using the 5G NAS security context available by assumption; and (ii) a MAC generated according to 4G specifications ('4G-MAC') using the 4G NAS security context available from having been registered in the 4G source network.

If the 5G target network does not possess the corresponding 5G NAS security context for the UE and therefore cannot verify the message, the target network forwards the complete 5G initial NAS message, including the 4G-MAC parameter, but excluding the 5G-MAC parameter, to the 4G source network for further action.

In an alternative approach, the UE and the 5G target network map the 5G initial NAS message to a message that has the structure of a 4G Tracking Area Update (TAU) or 4G Attach message. The UE then computes the 4G-MAC over the mapped message while the UE computes the 5G-MAC over the entire 5G initial NAS message. This mapping could be achieved, e.g., by selecting an appropriate subset of the 5G initial NAS message, or by other means. The alternative approach is required for interworking with so-called legacy MMEs in 4G that have not been upgraded to support interworking with 5G. Such legacy MMEs can only handle messages that have the structure of a 4G message. But the alternative approach could also be applied to interworking with MMEs that are not legacy.

The 4G source network verifies the integrity of the message based on the received 4G-MAC parameter. If the verification is successful, the 4G network generates a key to be used in the target network and sends it to the 5G target network. This key could either be a mapped key when the MME has been upgraded to support interworking with 5G, or a $K_{ASME}$ key (as defined in the LTE security specification TS 33.401, the disclosure of which is incorporated by reference by herein in its entirety) when the MME is a legacy MME.

The 5G target network implies from the response that the message has been verified by the 4G source network and subsequently uses the received key to generate a new set of 5G-NAS keys. An existing NAS security mode command procedure is used to complete the key setup in the UE.

In a second scenario (5G to 4G), assume that the MME in the target 4G network has been upgraded to support interworking with 5G networks. Recall from above, that according to illustrative embodiments, two different MAC parameters, a 4G-MAC and a 5G-MAC, are sent in the initial NAS message by the UE. It is further assumed the MME in the 4G network has been upgraded to support interworking with 5G networks and understands the purpose of the two different MAC parameters.

Figure 3:
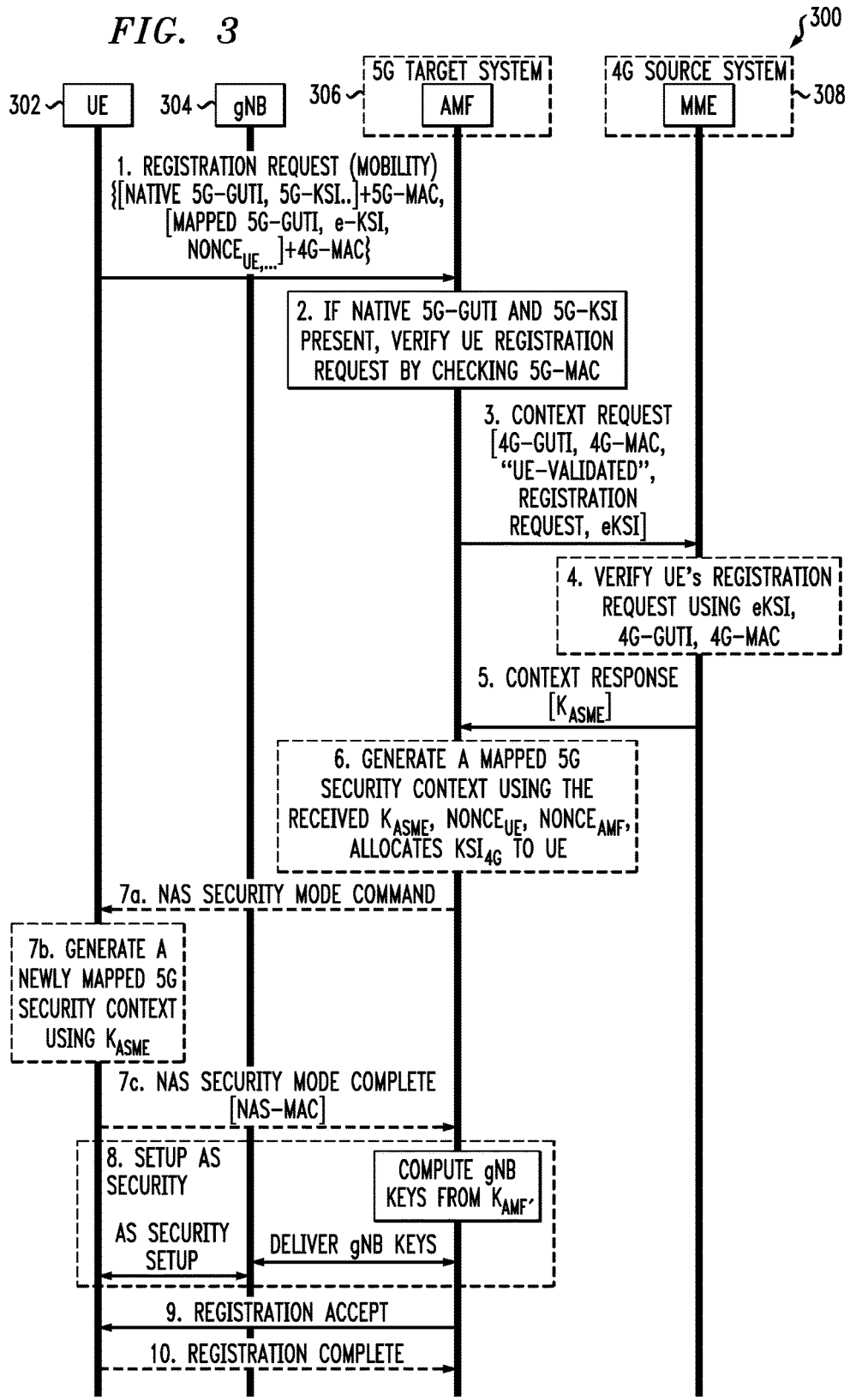
FIG. 3 shows a message flow for a secure intersystem mobility procedure in an illustrative embodiment.

FIGS. 3 and 4 illustrate message flows and network configurations within which one or more of the above-described secure intersystem mobility techniques can be implemented. These message flows and network configurations are understood to be illustrative embodiments.

FIG. 3 illustrates a UE mobility event from a 4G source network to a 5G target network. More particularly, the example in FIG. 3 shows an idle mode mobility event from 4G to 5G. The procedure depicts how two MACs are sent in the initial NAS message (Registration Request) and used during the mobility event to verify the UE either in the source network (4G) or in the target network (5G). FIG. 3 shows, in procedure 300, UE 302, gNB 304, 5G Target System (AMF) 306, and 4G Source System (MME) 308. The numbered steps referred to below correspond to the numbers 1 through 10 in FIG. 3. It is to be understood that in an idle mode mobility procedure, radio functions such as an eNB and a gNB do not necessarily take an active role.

In step 1, UE 302 initiates a mobility registration update with a Registration Request (RR) message sent to AMF 306 through gNB 304.

As shown, UE 302 includes the mapped 5G-GUTI derived from the 4G-GUTI, and KSI equal to the value of the eKSI associated with the current Evolved Packet System (EPS) security context, and a 32-bit $NONCE_{UE}$, in the Registration Request message. As is known, GUTI refers to a Globally Unique Temporary Identity, and KSI is Key Set Identifier.

The mapped 5G-GUTI has enough information to identify the 4G-GUTI and MME 308.

If the UE 302 has a current 5G NAS security context, then UE 302 integrity-protects the message using this context and includes the 5G-KSI, native 5G-GUTI and 5G-MAC in the Registration Request message. The UE 302 uses the current 5G NAS security context algorithms to generate the 5G-MAC for the Registration Request message.

The UE 302 additionally integrity-protects the message by generating a 4G-MAC using the current 4G NAS integrity identified by the 4G-GUTI used to derive a mapped 5G-GUTI. The 4G-MAC field is used to store the generated 4G-MAC. As indicated for an alternative embodiment above, the UE may alternatively compute the 4G-MAC over a message mapped from the entire 5G initial NAS message.

In step 2, if the 5G-GUTI was included in the message along with 5G-KSI, the AMF 306 searches for the already existing UE context stored and, if available, uses it to verify the Registration Request using the 5G-MAC parameter.

In step 3, the AMF 306 uses the mapped 5G-GUTI received from the UE to derive the MME address and sends a Context Request message to the MME 308 to retrieve user information.

The AMF 306 forwards the complete Registration Request message, or alternatively only the message mapped from the complete Registration Request message, except for the 5G-MAC, but including the "UE validated" field and the 4G GUTI to the MME 308 with the Context Request message. It includes the 4G-MAC and eKSI if and only if the UE 302 could not be validated in step 2 by checking the 5G-MAC. The "UE validated" field is used to indicate whether the AMF 306 has validated the integrity protection of the Registration Request based on the native 5G context.

In step 4, if the Registration Request message, or the mapped message, as received by the MME 308, was protected with a 4G MAC, the MME 308 verifies the integrity protection of the Registration Request message, or the mapped message, based on the current 4G security context identified by the eKSI value it received from the AMF 306. If the verification was successful, the MME 308 proceeds to step 5.

In step 5, MME 308 responds to the AMF 306 with a Context Response with the UE's security context. This message includes $K_{ASME}$, or a key mapped from $K_{ASME}$, if Context Request indicated that UE was not validated and 4G-MAC verification was successful. If the Context Response does not include $K_{ASME}$, or a key mapped from $K_{ASME}$, proceed to step 8.

In step 6, AMF 306 generates a new mapped $K_{AMF}$ using the $K_{ASME}$ key, or the key mapped from $K_{ASME}$, it obtained from the MME 308, $NONCE_{UE}$, and $NONCE_{AMF}$ and a 5G NAS security context is derived from the mapped $K_{AMF}$ key including NAS security keys. The AMF allocates $KSI_{4G}$ to identify the mapped $K_{AMF}$ key.

In step 7a., AMF 306 initiates a NAS Security mode command procedure as described in 3GPP Technical Specification TS 33.501, the disclosure of which is incorporated by reference herein in its entirety, including the $KSI_{4G}$, replayed UE Security capabilities, $NONCE_{AMF}$, $NONCE_{MME}$ and NAS algorithms.

In step 7b., UE 302 derives a mapped $K_{AMF}$ from its copy of $K_{ASME}$, or a key mapped from $K_{ASME}$, in the same way as the AMF did in step 7a. UE 302 further generates a new mapped 5G NAS Security context including NAS security keys from the mapped $K_{AMF}$.

In step 7c., UE 302 responds to the AMF 306 with the NAS Security Mode Complete message.

In step 8, if the AMF 306 shares a current 5G NAS security context with the UE 302 and has successfully validated the UE (from step 2), the AMF 306 proceeds to check if it needs to establish radio bearers. If the AMF 306 wants to change the NAS algorithms, the AMF 306 uses a NAS security mode procedure to inform the UE 302. If the "active flag" is set in the Registration Request message or the AMF 306 choses to establish radio bearers when there is pending downlink UP data or pending downlink signalling, a $K_{gNB}$ derivation is performed from the $K_{AMF}$ key.

The newly derived $K_{gNB}$ key is delivered to the target gNB on the S1 interface. The AS Security context is established between the gNB and the UE.

In step 9, AMF 306 sends a Registration Accept message to the UE 302.

In step 10, UE 302 responds with a Registration Complete message to the AMF 306.

As illustrated in the above procedure, an integrity check happens only once, either in the target AMF 306 in step 2 or in step 4 in the source MME 308. Accordingly, a decision is made in the AMF 306 to either reuse the existing verified UE context or rely on the mapped key derived from the information sent by the source MME 308 to generate a new mapped UE context. NAS security mode command procedure is optional if the AMF 306 successfully verified the UE 302 with its own store of the UE security context.

FIG. 4 illustrates a UE mobility event from a 5G source network to a 4G target network. More particularly, the example in FIG. 4 shows call flow for the mobility scenario from a 5G source system to an upgraded 4G target system using the dual 5G-MAC and 4G-MAC in a tracking area update request. FIG. 4 shows, in procedure 400, UE 402, eNB 404, 4G Upgraded Target System (MME) 406, and 5G Source System (AMF) 408. The numbered steps referred to below correspond to the numbers 1 through 10 in FIG. 4.

In step 1, UE 402 initiates a TAU (Tracking Area Update) Request message sent to MME 406 through eNB 404.

As shown, UE 402 includes the mapped 4G-GUTI derived from the 5G-GUTI, and eKSI equal to the value of the NG-KSI associated with the current 5GS security context, and a 32-bit $NONCE_{UE}$, in the TAU Request message.

The mapped 4G-GUTI has enough information to identity the 5G-GUTI and AMF 408.

If the UE 402 has a current 4G NAS security context, then UE 402 integrity-protects the message using this context and includes the eKSI, native 4G-GUTI and 4G-MAC in the TAU Request message. The UE 402 uses the current 4G NAS security context algorithms to generate the 4G-MAC for the TAU Request message.

The UE 402 additionally integrity-protects the message by generating a 5G-MAC using the current 5G NAS integrity identified by the 5G-GUTI used to derive a mapped 4G-GUTI. The 5G-MAC field is used to store the generated 5G-MAC.

In step 2, if the 4G-GUTI was included in the message along with 4G-KSI, the MME 406 searches for the already existing UE context stored and, if available, uses it to verify the TAU Request using the 4G-MAC parameter.

In step 3, the MME 406 uses the mapped 4G-GUTI received from the UE to derive the AMF address and sends a Context Request message to the AMF 408 to retrieve user information.

The MME 406 forwards the complete TAU Request message, except for the 4G-MAC, but including the "UE validated" field and the 5G GUTI to the AMF 408 with the Context Request message. It includes the 5G-MAC and NG-KSI if and only if the UE 402 could not be validated in step 2 by checking the 4G-MAC. The "UE validated" field is used to indicate whether the MME 406 has validated the integrity protection of the TAU Request based on the native 4G context.

In step 4, if the Registration Request message parameters contained in the TAU Request message, as received by the AMF 408, were protected with a 5G MAC, the AMF 408 verifies the integrity protection of the Registration Request message based on the current 5G security context identified by the NG-KSI value it received from the MME 406. If the verification was successful, the AMF 408 proceeds to step 5.

In step 5, AMF 408 responds to the MME 406 with a Context Response with the UE's security context. This message includes $K_{AMF}$ if Context Request indicated that UE was not validated and 5G-MAC verification was successful. If the Context Response does not include $K_{AMF}$, proceed to step 8.

In step 6, MME 406 generates a new mapped $K_{ASME}$ using the $K_{AMF}$ key it obtained from the AMF 408, $NONCE_{UE}$, and $NONCE_{AMF}$ and a 4G NAS security context is derived from the mapped $K_{ASME}$ key including NAS security keys. The AMF allocates $eKSI_{5G}$ to identify the mapped $K_{ASME}$ key.

In step 7a., MME 406 initiates a NAS Security mode command procedure as described in 3GPP Technical Specification TS 33.501, the disclosure of which is incorporated by reference herein in its entirety, including the $KSI_{4G}$, replayed UE Security capabilities, $NONCE_{AMF}$, $NONCE_{MME}$ and NAS algorithms.

In step 7b., UE 402 derives a mapped $K_{ASME}$ from its copy of $K_{AMF}$ in the same way as the MME did in step 7a. UE 402 further generates a new mapped 4G NAS Security context including NAS security keys from the mapped $K_{ASME}$.

In step 7c., UE 402 responds to the MME 406 with the NAS Security Mode Complete message.

In step 8, if the MME 406 shares a current 4G NAS security context with the UE 402 and has successfully validated the UE (from step 2), the MME 406 proceeds to check if it needs to establish radio bearers. If the MME 406 wants to change the NAS algorithms, the MME 406 uses a NAS security mode procedure to inform the UE 402. If the "active flag" is set in the TAU Request message or the MME 406 choses to establish radio bearers when there is pending downlink UP data or pending downlink signalling, a $K_{eNB}$ derivation is performed from the $K_{ASME}$ key using the KDF as specified in TS 33.501.

The newly derived $K_{eNB}$ key is delivered to the target gNB on the S1 interface. The AS Security context is established between the eNB and the UE.

In step 9, MME 406 sends a TAU Accept message to the UE 402.

In step 10, UE 402 responds with a TAU Complete message to the MME 406.

As illustrated in the above procedure, an integrity check happens only once, either in the target MME 406 in step 2 or in step 4 in the source AMF 408. Accordingly, a decision is made in the MME 406 to either reuse the existing verified UE context or rely on the mapped key derived from the information sent by the source AMF 408 to generate a new mapped UE context. NAS security mode command procedure is optional if the MME 406 successfully verified the UE 402 with its own store of the UE security context.

In yet another embodiment, the source mobility management entity may be an unmodified 4G mobility management entity with no awareness of a 5G interworking. Such 5G unaware mobility management entities would be able to support interworking and context transfer to a target 5G network AMF, if the 5G target AMF canonically maps the received registration request message from the UE to the 4G equivalent Context request message containing TAU parameters along with the 4G-MAC from the UE. The 5G AMF performs this intelligent mapping to the Context Request and the Context response based on its awareness that the source 4G mobility management entity is 5G unaware. With this functionality, a 5G AMF will interwork with a 5G aware MME as well as non-aware MME.

It is to be appreciated that the naming of identifiers and parameters mentioned herein are for illustrative purposes only. That is, an identifier or parameter may have different names or acronyms in different protocols and standards for different communication network technologies. As such, none of the specific names or acronyms given to these identifiers herein are intended to limit embodiments in any manner.

As indicated previously, the embodiments are not limited to the LTE or 5G context and the disclosed techniques can be adapted in a straightforward manner to a wide variety of other communication system contexts including, but not limited to, other 3GPP systems and non-3GPP systems.

The processor, memory, controller and other components of a user equipment or base station element of a communication system as disclosed herein may include well-known circuitry suitably modified to implement at least a portion of the identity request functionality described above.

As mentioned above, embodiments may be implemented in the form of articles of manufacture each comprising one or more software programs that are executed by processing circuitry of user equipment, base stations or other elements of a communication system. Conventional aspects of such circuitry are well known to those skilled in the art and therefore will not be described in detail herein. Also, embodiments may be implemented in one or more ASICS, FPGAs or other types of integrated circuit devices, in any combination. Such integrated circuit devices, as well as portions or combinations thereof, are examples of "circuitry" as that term is used herein. A wide variety of other arrangements of hardware and associated software or firmware may be used in implementing the illustrative embodiments.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, network element/function configurations, processes, messaging protocols and message formats than those described above in the context of the illustrative embodiments. These and numerous other alternative embodiments within the scope of the appended claims will be readily apparent to those skilled in the art.

What is claimed is:

1. A method comprising:
in accordance with the occurrence of a mobility event whereby user equipment moves from accessing a source network to accessing a target network in a communication system environment:
the user equipment generating a first integrity verification parameter associated with the target network;
the user equipment generating a second integrity verification parameter associated with the source network;
the user equipment generating a control plane message comprising the first integrity verification parameter and the second integrity verification parameter; and
the user equipment sending the control plane message to the target network; and
the user equipment accessing the target network responsive to verification utilizing at least one of the first integrity verification parameter and the second integrity verification parameter.

2. The method of claim 1, wherein the user equipment stores: (i) a security context currently established with the source network; and (ii) a security context previously established with the target network.

3. The method of claim 2, wherein the user equipment integrity protects the control plane message using the security context previously established with the target network.

4. The method of claim 3, wherein the user equipment additionally integrity protects the control plane message using the security context currently established with the source network.

5. The method of claim 3, wherein the user equipment maps the control plane message to another message in the format of a message in the source network and then additionally integrity protects the mapped message using the security context currently established with the source network.

6. The method of claim 2, wherein the control plane message comprises a registration message, and the registration message further comprises a temporary identifier of the user equipment associated with the target network and a key set indicator associated with the target network.

7. The method of claim 2, wherein the second integrity verification parameter associated with the source network is a message authentication code generated using the security context currently established with the source network.

8. The method of claim 2, wherein the first integrity verification parameter associated with the target network is a message authentication code generated using the security context previously established with the target network.

9. The method of claim 1, wherein one of the source network and the target network comprises a 4G network, and the other of the source network and the target network comprises a 5G network.

10. The method of claim 1, wherein the user equipment sends the control plane message to a mobility management element associated with the target network to enable the mobility management element of the target network to one of: (i) verify the user equipment utilizing the first integrity verification parameter and a security context previously established between the user equipment and the target network; and (ii) communicate with a mobility management element of the source network to verify the user equipment utilizing the second integrity verification parameter.

11. An apparatus comprising a processor operatively coupled to a memory configured to perform the steps of claim 1.

12. An article of manufacture comprising a non-transitory computer-readable storage medium having embodied therein executable program code that when executed by a processor causes the processor to perform the steps of claim 1.

13. A method comprising:
in accordance with the occurrence of a mobility event whereby user equipment moves from accessing a source network to accessing a target network in a communication system environment, a mobility management element of the target network receiving a control plane message from the user equipment comprising a first integrity verification parameter associated with the target network and a second integrity verification parameter associated with the source network;
the mobility management element of the target network verifying the user equipment utilizing at least one of the first integrity verification parameter and the second integrity verification parameter.

14. The method of claim 13, wherein the mobility management element of the target network verifies the user equipment using the first integrity verification parameter when the mobility management element of the target network maintains a security context previously established with the user equipment.

15. The method of claim 14, wherein, when the mobility management element of the target network is not able to verify the user equipment utilizing the first integrity verification parameter, the mobility management element of the target network communicates with the mobility management element of the source network to verify the user equipment utilizing the second integrity verification parameter by sending a context request message to a mobility management element of the source network to verify the user equipment.

16. The method of claim 14, wherein, the mobility management element of the target network canonically maps the control plane message to a source network equivalent context request message along with the second integrity verification parameter when the mobility management element of the source network is not updated for target network awareness to verify the user equipment.

17. The method of claim 15, wherein the mobility management element of the target network receives a context response message from the mobility management element of the source network when the mobility management element of the source network verifies the user equipment using a security context currently established with the user equipment.

18. The method of claim 17, wherein the mobility management element of the target network initiates establishment of a new security context with the user equipment.

19. The method of claim 13, wherein one of the source network and the target network comprises a 4G network, and the other of the source network and the target network comprises a 5G network.

20. An apparatus comprising a processor operatively coupled to a memory configured to perform the steps of claim 13.

21. An article of manufacture comprising a non-transitory computer-readable storage medium having embodied therein executable program code that when executed by a processor causes the processor to perform the steps of claim 13.

22. A method comprising:
in accordance with the occurrence of a mobility event whereby user equipment moves from accessing a source network to accessing a target network in a communication system environment, a mobility management element of the source network receiving a context request message from a mobility management element of the target network when the mobility management element of the target network is unable to verify the user equipment based on a control plane message received from the user equipment comprising a first integrity verification parameter associated with the target network and a second integrity verification parameter associated with the source network, the context request message comprising the second integrity verification parameter;
the mobility management element of the source network verifying the user equipment utilizing the second integrity verification parameter; and
the mobility management element of the source network sending a context response message to the mobility management element of the target network responsive to a successful verification of the user equipment utilizing the second integrity verification parameter.

23. The method of claim 22, wherein the mobility management element of the source network verifies the user equipment using a security context currently established with the user equipment.

24. The method of claim 23, wherein the mobility management element of the source network sends the context response message to the mobility management element of the target network to enable the mobility management element of the target network to initiate establishment of a new security context with the user equipment.

25. The method of claim 22, wherein one of the source network and the target network comprises a 4G network, and the other of the source network and the target network comprises a 5G network.

26. An apparatus comprising a processor operatively coupled to a memory configured to perform the steps of claim 22.

27. An article of manufacture comprising a non-transitory computer-readable storage medium having embodied therein executable program code that when executed by a processor causes the processor to perform the steps of claim 22.

* * * * *